United States Patent
Namiki et al.

(10) Patent No.: US 6,736,593 B2
(45) Date of Patent: May 18, 2004

(54) PROTECTIVE DEVICE FOR A TURBO MOLECULAR PUMP AND METHOD OF PROTECTING A TURBO MOLECULAR PUMP

(75) Inventors: Hirotaka Namiki, Chiba (JP); Akira Yamauchi, Chiba (JP)

(73) Assignee: BOC Edwards Technologies Limited, Chiba (JP)

( * ) Notice: Subject to any disclaimer, the term of this patent is extended or adjusted under 35 U.S.C. 154(b) by 162 days.

(21) Appl. No.: 10/108,530

(22) Filed: Mar. 27, 2002

(65) Prior Publication Data

US 2002/0164243 A1 Nov. 7, 2002

(30) Foreign Application Priority Data

Mar. 28, 2001 (JP) ........................................ 2001-093230

(51) Int. Cl.[7] .............................................. F04D 19/04
(52) U.S. Cl. .............................. 415/1; 415/16; 415/30; 415/90; 415/118; 416/44
(58) Field of Search ............................. 415/1, 16, 30, 415/90, 118; 416/44

(56) References Cited

U.S. PATENT DOCUMENTS

| 4,023,920 A | | 5/1977 | Bächler et al. ............ 417/354 |
| 4,822,251 A | * | 4/1989 | Amrath et al. ............ 415/118 |
| 5,443,368 A | * | 8/1995 | Weeks et al. ............. 415/118 |
| 5,667,363 A | * | 9/1997 | Bernhardt et al. ........... 415/90 |
| 6,123,522 A | | 9/2000 | Kubo et al. ............. 417/423.4 |

FOREIGN PATENT DOCUMENTS

| EP | 1036951 | | 9/2000 | |
| EP | 1046821 | | 10/2000 | |
| JP | 04050499 A | * | 2/1992 | ........... F04D 19/04 |

* cited by examiner

*Primary Examiner*—Edward K. Look
*Assistant Examiner*—Igor Kershteyn
(74) *Attorney, Agent, or Firm*—Adams & Wilks (57) ABSTRACT

A protective device is provided for protecting a turbo molecular pump having a rotor mounted for undergoing rotation, an intake port for sucking gas by rotation of the rotor, and an exhaust port for exhausting the gas sucked from the intake port. The protective device has a detecting device for detecting the occurrence of an abnormal phenomenon in the turbo molecular pump. An abnormal phenomenon inference device infers a type of the abnormal phenomenon detected by the detecting device. A value obtaining device infers a magnitude of damage given to the turbo molecular pump by the abnormal phenomenon inferred by the abnormal phenomenon inference device and obtains a value weighted based on the inferred magnitude of the damage. A value accumulation device accumulates the value obtained by the value obtaining device. A sum obtaining device obtains a sum of the values accumulated in the value accumulation device. A protecting device protects the turbo molecular pump in a case where the sum obtained by the sum obtaining device exceeds a predetermined value.

8 Claims, 7 Drawing Sheets

ATMOSPHERIC AIR INJECTION POINT TABLE 48

| ABNORMAL RPM \ RPM CHANGE RATE | A SMALL | B INTERMEDIATE | C LARGE | |
|---|---|---|---|---|
| ~1.0×10⁴ | 1 | 2 | 4 | a |
| 1.0×10⁴~1.5×10⁴ | 3 | 4 | 6 | b |
| 1.5×10⁴~2.0×10⁴ | 6 | 7 | 9 | c |
| 2.0×10⁴~2.5×10⁴ | 11 | 12 | 14 | d |
| 2.5×10⁴~3.0×10⁴ | 16 | 18 | 20 | e |
| 3.0×10⁴~ | 25 | 30 | 35 | f |

FIG.10

PROTECTIVE DEVICE FOR A TURBO MOLECULAR PUMP AND METHOD OF PROTECTING A TURBO MOLECULAR PUMP

BACKGROUND OF THE INVENTION

1. Field of the Invention

The present invention relates to a protective device for a turbo molecular pump and a method of protecting a turbo molecular pump, and to, for example, a protective device for a turbo molecular pump and a method of protecting a turbo molecular pump when an abnormal phenomenon such as injection of atmospheric air to the turbo molecular pump during the operation occurs.

2. Description of the Related Art

A turbo molecular pump is mounted in, for example, a vacuum tank (chamber) of a semiconductor manufacturing apparatus and is used to discharge process gas within the vacuum tank or used in the case where a high vacuum condition is realized like evacuating a chamber in which an observation sample of an electronic microscope is installed.

In some cases, the interior of the vacuum tank is rapidly exposed in the atmospheric pressure like a case where a leak valve of the vacuum tank is erroneously opened by the operator during the operation of the turbo molecular pump or a measurement equipment or an observation window mounted on a vacuum portion is broken down.

In the interior of the turbo molecular pump, rotor blades are rotated at a high speed of, for example, about 30,000 rpm together with a rotor. For this reason, when such atmospheric air is introduced into the turbo molecular pump that works under such a high vacuum condition, there is a fear that a load the turbo molecular pump receives is rapidly increased and constituents such as a bearing or rotor blades constituting the turbo molecular pump or a joint portion of the constituents would be damaged.

In order to protect the turbo molecular pump when such an abnormal phenomenon occurs, in the conventional turbo molecular pump, the abnormal phenomenon is detected as in a case where, for instance, a vibration of the rotor in a radial direction or a thrust direction is detected or a change in rpm of the rotor is detected and a protective device like stopping the turbo molecular pump is provided.

However, the kinds of the abnormal phenomena against which the turbo molecular pump should be protected are various like an occurrence of a damage of bearing portion, an entrainment of a foreign matter into the pump interior, a damage of revolving bodies such as rotor blades or the like, an external turbulence such as an earthquake, a power shortage or the like in addition to the above-described accidental injection of the atmospheric air.

However, when the abnormal phenomenon occurs, the conventional protective device for the turbo molecular pump does not well cope with the abnormal phenomena according to the kind thereof.

Accordingly, an object of the present invention is to provide a protective device for a turbo molecular pump and a method of protecting a turbo molecular pump that may cope with abnormality according to the kind thereof when the abnormal phenomenon occurs.

SUMMARY OF THE INVENTION

In order to achieve the above-mentioned object, according to the present invention, there is provided a protective device for a turbo molecular pump having a rotor for undergoing rotation, an intake port for sucking gas by rotation of the rotor, and an exhaust port for exhausting the gas sucked from the intake port. The protective device comprises detecting means for detecting that an abnormal phenomenon occurs in the turbo molecular pump, abnormal phenomenon inference means for inferring a type of the abnormal phenomenon detected by the detecting means, value obtaining means for inferring a magnitude of damage given to the turbo molecular pump by the abnormal phenomenon inferred by the abnormal phenomenon inference means and obtaining a value weighted based on the inferred magnitude of the damage, value accumulation means for accumulating the value obtained by the value obtaining means, sum obtaining means for obtaining a sum of the values accumulated in the value accumulation means, and protecting means for protecting the tubo molecular pump in the case where the sum obtained by the sum obtaining means exceeds a predetermined value (first structure).

In the first structure of the present invention, there may be constructed a protective device further comprising a change rate obtaining means for obtaining a change rate in a rotating speed of the rotor, in which the abnormal phenomenon inference means infers a kind of the abnormal phenomenon from a change rate in rpm of the rotor obtained by the change rate obtaining means (second structure).

Also, in the first structure of the present invention, there may be constructed a protective device, further comprising a load detecting means for detecting a load to be applied to the rotor in an axial direction of the rotor, in which the abnormal phenomenon inference means infers a kind of the abnormal phenomenon from a load detected by the load detecting means (third structure).

Further, in any one of the first to third structures of the present invention, there may be constructed a protective device, further comprising an rpm obtaining means for obtaining an rpm of the rotor, in which the value obtaining means infers a magnitude of the damage according to the rotating speed of the rotor obtained at least by the rpm obtaining means when the abnormal phenomenon is detected by the detecting means (fourth structure).

Further, in any one of the first to fourth structures of the present invention, there may be constructed a protective device, in which the protective means is provided with at least one of a stopping means for stopping the turbo molecular pump, a restart disabling means for disabling a restart instruction for restarting the turbo molecular pump, and an alarm means for giving an alarm to an operator of the turbo molecular pump (fifth structure).

Further, in any one of the first to fifth structures of the present invention, there may be constructed a protective device, in which the abnormal phenomenon inferred by the abnormal phenomenon inference means is the fact that the atmospheric air is injected from the intake port during the operation of the turbo molecular pump.

Further, there may be constructed a protective device, in which a kind of the abnormal phenomenon inferred by the abnormal phenomenon inference means includes, in addition to the injection of the atmospheric air, at least one of a touchdown of the rotor to a protective bearing for protecting the rotor in the case where the rotor is held by a magnetic bearing, a mixture of foreign matters to the bearing for holding the rotor, a power outage of a power to be fed to the turbo molecular pump, and an external turbulence of the turbo molecular pump by an external force.

In another aspect, in order to achieve the above-mentioned object, there is provided a method of protecting a turbo molecular pump according to the present invention. A turbo molecular pump having a rotor for undergoing rotation, an intake port for sucking gas by rotation of the rotor, and an exhaust port for exhausting the gas sucked from the intake port is provided. A fact that an abnormal phenomenon is generated in the turbo molecular pump is then detected and a type of the abnormal phenomenon is inferred. A magnitude of damage given to the turbo molecular pump by the inferred abnormal phenomenon is then inferred and a value weighted based on the inferred magnitude of the damage is obtained. The value obtained based on the inferred magnitude of the damage is then accumulated. A sum of the accumulated values is then obtained. A protecting means for protecting the turbo molecular pump is then operated in a case where the sum of the accumulated values obtained exceeds a predetermined value.

DESCRIPTION OF THE PREFERRED EMBODIMENT

A preferred embodiment of the present invention will be described below in detail with reference to FIGS. 1 to 10.

Figure 1:
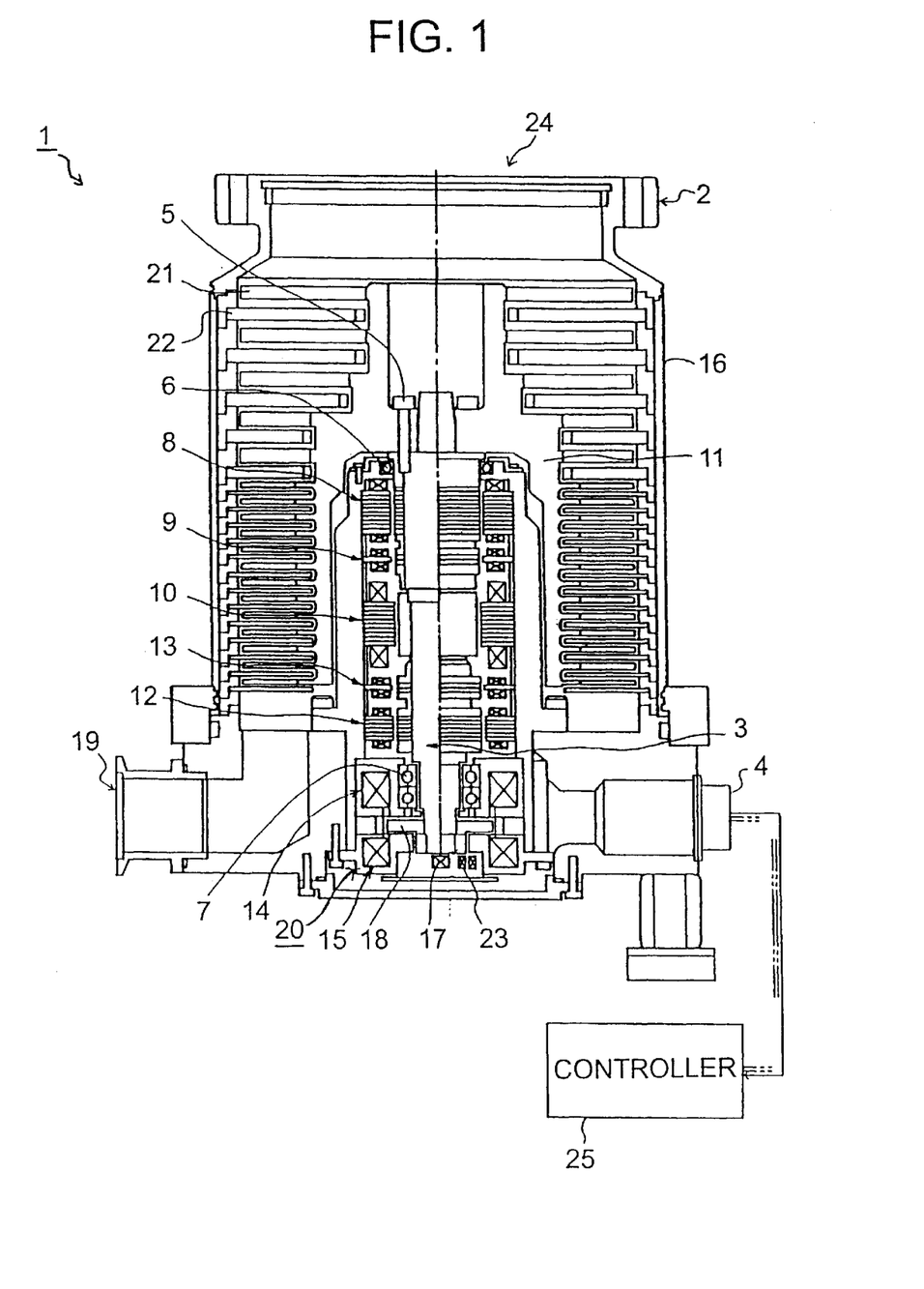
FIG. 1 is a cross-sectional view showing a cross section of a turbo molecular pump in a rotor axial direction.

FIG. 1 is a cross-sectional view showing a magnetic bearing type turbo molecular pump in cross section in an axial direction of a rotor.

A casing 16 is formed into a cylindrical shape to constitute an outer shell of the turbo molecular pump 1.

A rotor shaft 3 is disposed in the center of the casing 16.

Magnetic bearing portions 8, 12 and 20 are provided respectively in an upper portion, a lower portion and a bottom portion of the rotor shaft 3 with respect to the paper surface. When the turbo molecular pump 1 works, the rotor shaft 3 is supported magnetic-levitationally in a non-contact manner in a radial direction (a radial direction of the rotor shaft 3) by the magnetic bearing portions 8 and 12 and supported magnetic-levitationally in a non-contact manner in a thrust direction (an axial direction of the rotor shaft 3) by the magnetic bearing portion 20.

These magnetic bearing portions constitute a so-called 5-axis controlling type magnetic bearing, and the rotor shaft 3 and a rotor 11 fixed to the rotor shaft 3 have a degree of freedom of rotation about the axis of the rotor shaft 3.

In the magnetic bearing portion 8, four electromagnets are arranged to confront each other at an interval of 90° around the rotor shaft 3. The rotor shaft 3 is formed of high permeability material such as iron and is adapted to be attracted by the magnetic force of these electromagnets.

A displacement sensor 9 detects a radial displacement of the rotor shaft 3 by sampling it at a predetermined time interval. When the displacement of the rotor shaft 3 from the predetermined position in the radial direction is detected by a displacement signal from the displacement sensor 9, a controller 25 adjusts the magnetic force of each electromagnet to operate so that the rotor shaft 3 is returned back to the predetermined position. The exciting current of each electromagnet is feedback-controlled to adjust the magnetic force of the electromagnet.

The controller 25 feedback-controls the magnetic bearing portion 8 in accordance with the signal of the displacement sensor 9, whereby the rotor shaft 3 is magnetically levitated in the radial direction with a predetermined clearance from the electromagnet in the magnetic bearing portion 8 and is held in a non-contact manner in the space.

The structure and the effect of the magnetic bearing portion 12 are the same as those of the magnetic bearing portion 8.

In the magnetic bearing portion 12, four electromagnets are arranged to confront each other at an interval of 90° around the rotor shaft 3. The rotor shaft 3 is held in a non-contact manner in the radial direction in the magnetic bearing portion 12 by the magnetic attractive force of the magnetic force of these electromagnets.

A displacement sensor 13 detects a radial displacement of the rotor shaft 3 by sampling it at a predetermined time interval.

When the rotor shaft 3 receives the displacement signal in the radial direction from the displacement sensor 13, the controller 25 corrects this displacement and feedback-controls the exciting current of the electromagnet so as to hold the rotor shaft 3 in a predetermined position.

The controller 25 feedback-controls the magnetic bearing portion 12 based on the signal of the displacement sensor 13, whereby the rotor shaft 3 is magnetically levitated in the radial direction in the magnetic bearing portion 12 and held in a non-contact manner in the space.

Thus, since the rotor shaft 3 is held in the radial direction at two positions of the magnetic bearing portions 8 and 12, the rotor shaft 3 is held in the predetermined position in the radial direction.

The magnetic bearing portion 20 provided at the lower end of the rotor shaft 3 is constituted of a disc-like metal disc 18, electromagnets 14 and 15 and a displacement sensor 17 and is adapted to hold the rotor shaft 3 in the thrust direction.

The metal disc 18 is comprised of high permeability material such as iron and is fixed vertically to the rotor shaft 3 in its own center. The electromagnet 14 is installed on the metal disc 18 and the electromagnet 15 is installed under the disc. The electromagnet 14 attracts the metal disc 18 upwardly by the magnetic force. The electromagnet 15 attracts the metal disc 18 downwardly. The controller 25 adjusts suitably the magnetic force by which the electromagnets 14 and 15 works on the metal disc 18, magnetically levitates the rotor shaft 3 in the thrust direction and holds it in a non-contact manner in the space.

The displacement sensor 17 detects the displacement in the thrust direction of the rotor shaft 3 by sampling it and feeds it to the controller 25. The controller 25 supervises the displacement in the thrust direction of the rotor shaft 3 in accordance with the displacement detection signal received from the displacement sensor 13.

In a case where the rotor shaft 3 is moved in either direction of the thrust direction and shifted from a predetermined position, in order to correct this displacement, the controller 25 feedback-controls the exciting current of the electromagnets 14 and 15 to adjust the magnetic force and operates the rotor shaft 3 to be returned back to the predetermined position. The rotor shaft 3 is magnetically levitated and held in the predetermined position in the thrust direction by the feedback control.

As described above, the rotor shaft 3 is held in the radial direction by means of the magnetic bearing portions 8 and 12 and held in the thrust direction by the magnetic bearing portion 20 so that the rotor shaft 3 may be rotated around its own axis.

A protective bearing 6 is provided on the magnetic bearing portion 8 in the axial direction of the rotor shaft 3, and a protective bearing 7 is provided under the magnetic bearing portion 12, respectively.

The rotor shaft 3 is magnetically levitated and held in a non-contacted manner in the space by the magnetic bearing portions 8, 12 and 20 but there is some case where the rotor shaft 3 is considerably displaced from the held position, such as a case where the vibration occurs around the axis of the rotor shaft 3. The protective bearings 6 and 7 are provided for such cases in order to prevent the rotor shaft 3 from coming into contact with the electromagnets of the magnetic bearing portions 8, 12 and 20 or to prevent permanent magnets from coming into contact with the electromagnets in a motor portion 10.

When the rotor shaft 3 is moved to exceed a certain extent from the predetermined position, the rotor shaft 3 is brought into contact with the protective bearings 6 and 7 so that the movement of the rotor shaft 3 is physically limited.

The motor portion 10 is provided between the magnetic bearing portions 8 and 12 in the rotor shaft 3. In this embodiment mode, as one example, the motor portion 10 is a DC brushless motor having the following structure.

The permanent magnets are fixed around the rotor shaft 3 in the motor portion 10.

These permanent magnets are mounted in a direction around the axis of the rotor shaft 3 with N-poles and S-poles arranged at, for example, every 180°.

For example, six electromagnets are arranged at every 60° symmetrically with respect to the axis of the rotor shaft 3 and facing each other through a predetermined clearance from the permanent magnets and around the permanent magnets.

Also, an rpm sensor 23 is mounted at a lower end of the rotor shaft 3. The controller 25 is adapted to detect the rpm of the rotor shaft 3 in accordance with the detection signal of the rpm sensor 23. Also, a not shown sensor for detecting a phase of the rotation of the rotor shaft 3 is mounted in the vicinity of, for example, the displacement sensor 13. The controller 25 is adapted to detect the position of the permanent magnets by using the detection signals of the last-mentioned sensor and the rpm sensor 23 together.

The controller 25 switches the currents of the electromagnets one after another in accordance with the detected position of the magnetic poles so that the rotation of the rotor shaft 3 is kept. Namely, the controller 25 switches the exciting currents of the six electromagnets to generate a rotary magnetic field around the permanent magnets fixed to the rotor shaft 3 and to cause the permanent magnets to follow this rotary magnetic field to thereby rotate the rotor shaft 3.

A rotor 11 is fixed to the rotor shaft 3 by a bolt 5. When the rotor shaft 3 is driven and rotated by the motor portion 10, the rotor 11 is adapted to rotate together with this.

A plurality of stages of rotor blades 21 are mounted radially from the rotor 11 and slanted at a predetermined angle from a plane perpendicular to the axis of the rotor shaft 3. The rotor blades 21 are fixed to the rotor 11 so that they rotate together with the rotor 11 at a high speed.

Also, stator blades 22 are fixed toward the inside of the casing 16 and alternatively with the stages of the rotor blades 21 in the casing 16. Also, the stator blades 22 are fixed to the casing 16 at a predetermined angle from a plane perpendicular to the axis of the rotor shaft 3.

When the rotor 11 is driven by the motor portion 10 to rotate together with the rotor shaft 3, gas is sucked from an intake port 24 and exhausted from an exhaust port 19 by the action of the rotor blades 21 and the stator blades 22.

A flange 2 is formed around the intake port 24 so that the turbo molecular pump 1 may be coupled with a vacuum tank or the like of the semiconductor manufacturing apparatus.

The controller 25 is connected to a connector 4 of the turbo molecular pump 1 to perform the control of the magnetic bearing portions 8, 12 and 20, the motor portion 10 or the like.

When the thus constructed turbo molecular pump 1 operates, the rotor 11 is levitated in a predetermined position by means of the magnetic bearing portions 8, 12 and 20 while receiving the control of the controller 25. Subsequently, the rotor shaft 3 is driven by means of the motor portion 10 and rotates around the axis of the rotor shaft 3. In accordance with this, the rotor 11 rotates.

Thus, the rotor blades 21 are also rotated. According to the operation of the rotor blades 21 and the stator blades 22, the gas in the vacuum tank is sucked from the intake port 24 and exhausted from the exhaust port 19.

Figure 2:
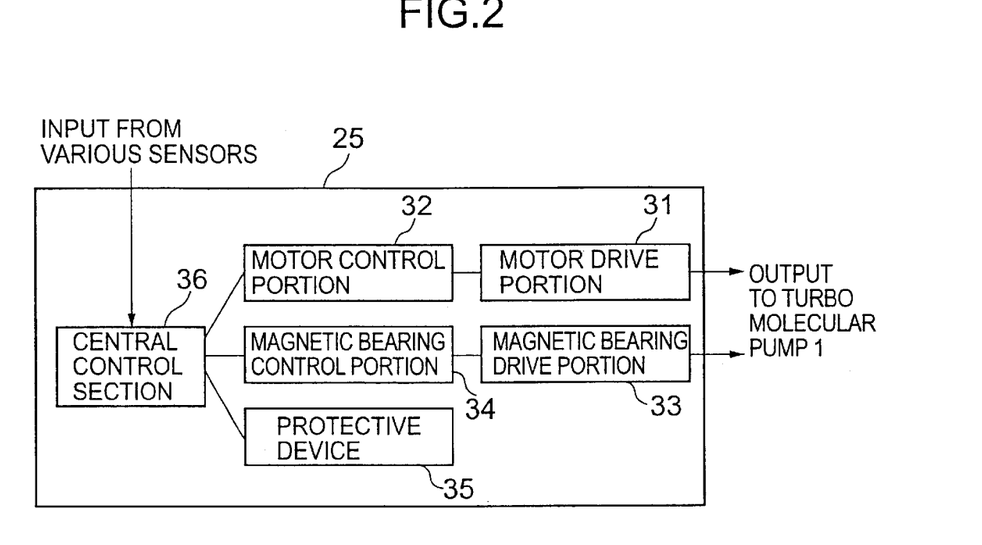
FIG. 2 is a schematic view showing an internal structure of a controller for the turbo molecular pump.

FIG. 2 is a block diagram schematically showing the interior structure of the controller 25.

The controller 25 is provided with a central control section 36. The central control section 36 is connected to various sensors such as the displacement sensors 9, 13, 17, and the rpm sensor 23 and adapted to receive the signals of these sensors.

The central control section 36 is provided with a ROM (read only memory), a central processing device and the like, which are not shown.

A program for controlling and operating the turbo molecular pump 1 is stored in the ROM.

The central processing device of the central control section 36 processes the signals received from the respective sensors such as the displacement sensors 9, 13 and 17 and the rpm sensor 23 in accordance with the program and transmits control signals to a motor control portion 32 and a magnetic bearing control portion 34.

Furthermore, the central control section 36 detects the displacement of the rotor shaft 3, the load to be applied to the rotor shaft 3, the load of the motor portion 10 and the like in accordance with the data obtained from the various sensors and detects the occurrence of abnormal phenomenon in the turbo molecular pump 1 from the change in these values. Then, in the case where the abnormal phenomenon is detected, the central control section 36 transmits an abnormal phenomenon occurrence signal to a protective device 35.

The motor control portion 32 controls the respective electromagnets of the motor portion 10 through a motor drive portion 31.

The motor control portion 32 receives the control signal for controlling the motor portion 10 from the central control section 36. Then, the motor control portion 32, for example, compensates for this signal to generate a signal for controlling polarities of the respective electromagnets or the exciting currents to thereby send the signal to the motor drive portion 31.

The motor drive portion 31 is composed of a current amplifier and the like and amplifies the control signal received from the motor control portion 32 and supplies it to the respective electromagnets.

The magnetic bearing control portion 34 controls the exciting currents to be supplied to the respective electromagnets of the magnetic bearing portions 8, 12 and 20 through a magnetic bearing drive portion 33.

The magnetic bearing control portion 34 receives the control signal from the central control section 36. Then, the magnetic bearing control portion 34, for example, compensates for this signal to generate a signal for controlling the exciting currents of the respective electromagnets and sends the signal to the magnetic bearing drive portion 33.

The magnetic bearing drive portion 33 is composed of a current amplifier and the like and amplifies the control signal received from the magnetic bearing control portion 34 and supplies it to the respective electromagnets.

The controller 25 is further provided with the protective device 35. When the abnormal phenomenon occurs, the protective device 35 infers the magnitude of damage received by the turbo molecular pump 1 and numerates it (this value will hereinafter be referred to as a point).

Furthermore, the protective device 35 adds and accumulates this point whenever the abnormal phenomenon occurs and is adapted to exhibit a protective function for protecting the turbo molecular pump 1 at the time when the accumulated point value reaches a predetermined value.

The basis of how to think about the background for constructing the protective device 35 will now be described. Incidentally, the structure and the operation of the protective device 35 will be described later in detail.

There are various kinds of abnormal phenomena generated during the operation of the turbo molecular pump 1. For example, there are given the case where the atmospheric air is injected into the intake port 24 during the operation of the turbo molecular pump 1, the case where the rotor shaft 3 is brought into contact with the protective bearings 6 and 7 to touch down, the case where, after the rotor shaft 3 has touched down, the foreign matter would be clamped in the protective bearings 6 and 7, for example, to cause the hindrance against the operation of the bearings, and the like.

The magnitude of damage to be given to the turbo molecular pump 1 differs in accordance with a kind of the abnormal phenomenon. Also, since, as the rotor 11 rotates at a higher speed, the rotor 11 has a larger dynamic energy, the damage to be given to the turbo molecular pump 1 differs also in accordance with the rpm of the rotor 11 at the time when the abnormal phenomenon occurs.

Incidentally, the occurrence of the hindrance against the operation of the protective bearings 6 and 7 will hereinafter be referred to as a scuffing.

According to the experiments or the like, it is possible to inspect in advance the magnitude of damage to be given to the turbo molecular pump 1 for every kind of the abnormal phenomenon and at every rotating speed of the rotor 11 at the time when the abnormal phenomenon takes place.

Therefore, when the abnormal phenomenon occurs in the turbo molecular pump 1, if the rotating speed of the rotor 11 is obtained and the kind of the abnormal phenomenon may be inferred, it is possible to infer the magnitude of damage given to the turbo molecular pump 1 by the abnormal phenomenon according to the experimental data or the like.

Also, it is possible to use a numerical value (hereinafter referred to as a point) weighed in accordance with the magnitude of damage as an index indicating the magnitude of damage given to the turbo molecular pump 1 by the abnormal phenomenon.

Furthermore, according to the experiments or the like, if, in advance, the point weighed with the magnitude of damage given to the turbo molecular pump 1 by the abnormal phenomenon is caused to correspond to each pattern of the abnormal phenomenon and this list is expressed in a table, it is possible to obtain from the table the point corresponding to the abnormal phenomenon whenever the abnormal phenomenon takes place in the turbo molecular pump 1 and to add the point.

Then, the sum of the added points is used as an index by which the magnitude of damage accumulated in the turbo molecular pump 1 is inferred according to the abnormal phenomena in the past.

If, in accordance with the experiments or the like, the range of the sum of the points in which the turbo molecular pump 1 may be operated in safety is inspected in advance, when the sum of the points exceeds this range, it is possible to take a necessary step like, for example, stopping the turbo molecular pump 1 or alarming the operator. In addition, it is possible to conduct maintenance such as inspection or exchange of parts.

Also, although described in more detail later, there are characteristics of the respective phenomena in a change rate in rotating speed of the rotor 11, a load to be applied to the magnetic bearing portions 8, 12 and 20 or the like at the time when the abnormal phenomenon is generated.

Then, if these characteristics are recognized in advance, the change rate in rotating speed of the rotor 11 is measured when the abnormal phenomenon is actually generated and this is compared with each kind of the characteristics recognized in advance, whereby the kind of the abnormal phenomenon can be inferred.

Figure 3:
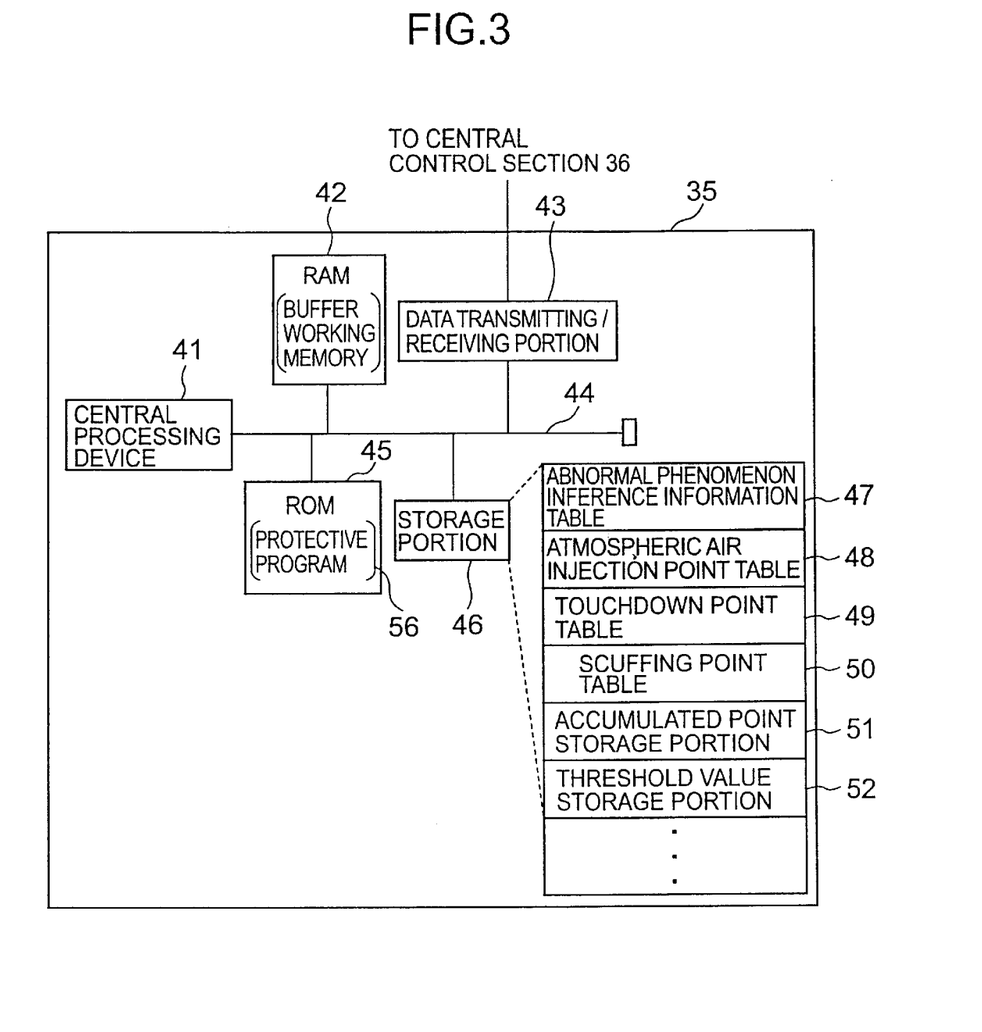
FIG. 3 is a block diagram schematically showing a structure of a protective device.

FIG. 3 is a block diagram schematically showing the structure of the protective device 35.

The protective device 35 is composed of a central processing device 41, a RAM (random access memory) 42, a ROM 45, a storage portion 46, a data transmitting/receiving portion 43 and the like. These structural elements are connected to each other through a bus line 44 so that mutual transmission/reception of the data is enabled.

Another program needed to infer the kind of the abnormal phenomenon generated in the turbo molecular pump 1 and to operate the protective device 35 or a protective program 56 for numerating the magnitude of damage is stored in the ROM 45. The program stored in the ROM 45 may be held even if the electric power is not supplied to the controller 25.

The RAM 42 provides a working memory when the central processing device 41 performs the arithmetic calculation, a buffer for temporarily storing the rotating speed of the rotor 11, or the like as will be described later. The data stored in the RAM 42 is eliminated in the case where the electric power is not supplied to the controller 25.

The storage portion 46 is composed of, for example, a device such as an RAM backed up by a battery or a hard disc which may hold the storage contents even if the electric power is not supplied to the controller 25 and may further rewrite the storage contents.

An abnormal phenomenon inference information table 47, an atmospheric air injection point table 48, a touchdown point table 49, a scuffing point table 50, an accumulated point storage portion 51, and a threshold value storage portion 52 to be described later are formed in the storage portion 46.

The data transmitting/receiving portion 43 is connected to the central control section 36 for performing the intervention of transmission/reception of the data between the central control section 36 and the central processing device 41.

For instance, the abnormal phenomenon generation signal generated in the case where the abnormal phenomenon is generated in the turbo molecular pump 1 or the data such as the rpm of the rotor 11 is received from the central control section 36 and transmitted to the central processing device 41. Alternatively, the signal such as the alarm signal generated by the central processing device 41, for example, at the time when the points accumulated by the addition exceed the predetermined range is fed to the central control section 36.

When the central processing device 41 receives the abnormal phenomenon generation signal from the central control section 36, it performs various calculations such as evaluation of the sum of added points, the calculation of the points and the inference of the kind of the abnormal phenomenon in accordance with the protective program 56.

Furthermore, as a result of the calculation, the central processing device 41 transmits the stop signal to the central control section 36 in accordance with the protective program 56 to stop the turbo molecular pump 1 in the case where the sum of the points exceeds the predetermined value as described later.

Figure 4:
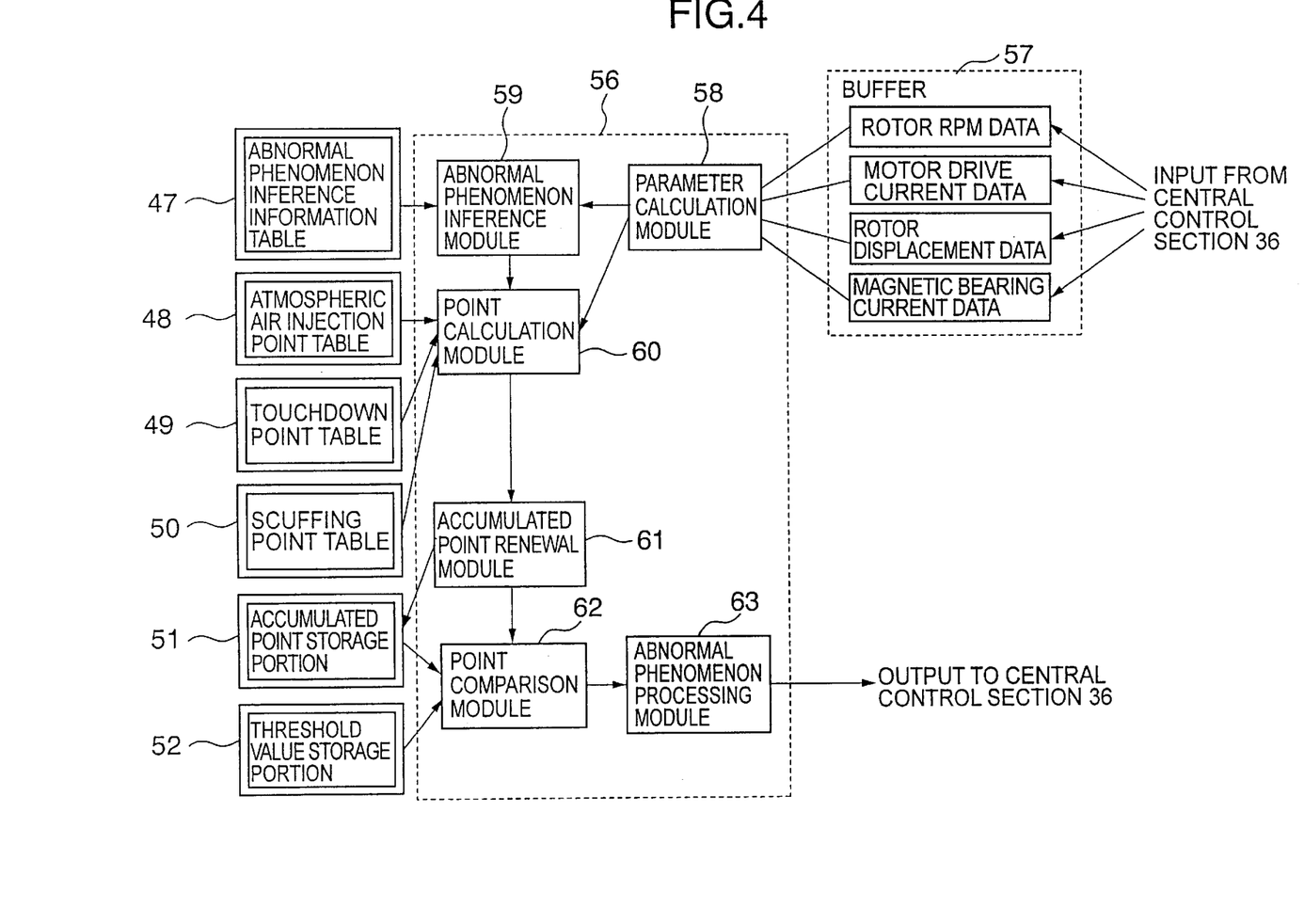
FIG. 4 is a view showing a procedure of steps of processing various data in accordance with a protective program by a central processing device.

FIG. 4 is a view showing mainly the operation of the protective program 56 and the steps for processing various data by the central processing device 41.

A buffer 57 is a storage region formed in the RAM 42 and temporarily stores through the data transmitting/receiving portion 43 the rotor rpm data, the motor drive current data, the rotor displacement data and the magnetic bearing current data received from the controller 25.

It should be noted here that the rotor rpm data is the sampling data of the rpm of the rotor 11, the motor drive current data is the sampling data of the exciting current values of the respective electromagnets constituting the motor portion 10, the rotor displacement data is the sampling data of the displacements of the rotor 11 detected by the displacement sensors 9, 13 and 17, and the magnetic bearing current data is the sampling data of the exciting current of the respective electromagnets constituting the magnetic bearing portions 8, 12 and 20.

More specifically, the buffer 57 eliminates these data after holding them for a predetermined period of time when receiving these data from the controller 25. For example, if it is set such that the data is held for twenty seconds, the buffer 57 receives and holds the data transmitted from the controller 25 one after another and eliminate the old data twenty second before in order. The buffer 57 repeats this operation and stores and holds the change of the various data for twenty seconds.

Also, when the central processing device 41 receives the abnormal phenomenon generation signal from the central control section 36, the buffer 57 is adapted to stop the reception of the data and hold the data within the buffer 57 after the various data have been received and stored for a predetermined period of time after the generation of the abnormal phenomenon.

For example, the buffer 57 holds the data for twenty seconds. Furthermore, the buffer 57 stops while holding the storage after the data are picked up for fifteen seconds from the time when the central processing device 41 receives the abnormal phenomenon generation signal. Then, the various data from five seconds before the generation of the abnormal phenomenon to fifteen seconds after the generation of the abnormal phenomenon are stored in the buffer 57.

With such a structure of the buffer 57, when the abnormal phenomenon occurs in the turbo molecular pump 1, for instance, the history of change in rpm of the rotor 11 may be stored in the buffer 57 and it is possible to use these data for analyses to infer the kind of the abnormal phenomenon or for calculation of the points.

The protective program 56 is composed of a parameter calculation module 58, an abnormal phenomenon inference module 59, a point calculation module 60, an accumulated point renewal module 61, a point comparison module 62, an abnormal phenomenon processing module 63 and the like.

These modules are downloaded from the ROM 45 to the central processing device 41 to be brought into the operable condition when the controller 25 is started.

Then, the protective program 56 operates when the central processing device 41 receives the abnormal phenomenon generation signal from the central control section 36.

When the central control section 36 transmits the abnormal phenomenon generation signal, the parameter calculation module 58 reads out and analyses the various data in the range of a predetermined period of time (for example, from five seconds before the generation of the abnormal phenomenon to fifteen seconds after the generation of the abnormal phenomenon) from the buffer 57 and calculates the various parameters such as the change rate in rpm of the rotor 11, the load applied to the rotor shaft 3 and the load applied to the rotor 11. Also, the data needed for calculating the points such as rpm of the rotor 11 before the generation of the abnormal phenomenon is transmitted to the point calculation module 60 to be described later.

It is possible to seek the change rate in rpm of the rotor 11 by sampling the rpm of the rotor 11 at a predetermined time interval and dividing the difference in the rpm by the time interval or differentiating the rpm by time.

It is possible to infer the load applied to the rotor shaft 3 in, for example, the axial direction of the rotor shaft 3 from the exciting currents of the electromagnets 14 and 15 of the magnetic bearing portion 20 or the displacement detected by the displacement sensor 17.

It is possible to infer the load applied to the rotor 11 from the change in rpm of the rotor 11, the current supplied to the motor portion 10 or the like.

The abnormal phenomenon inference module 59 obtains the parameters such as the displacement of the rotor shaft 3 and the change rate in rpm of the rotor 11 from the parameter calculation module 58 and thereafter compares them with the characteristics of the various abnormal phenomena stored in the abnormal phenomenon inference information table 47 to thereby infer the kind of the abnormal phenomenon.

Each abnormal phenomenon has its own characteristics distinguishable from other kinds of abnormal phenomena, such as the change rate in rpm of the rotor 11, the load applied to the rotor shaft 3 and the load applied to the motor portion 10, for example, and the abnormal phenomenon inference information table 47 is one having these characteristics in the table.

As one example, the characteristics of the change in rpm of the rotor 11 in each abnormal phenomenon will be described with reference to FIGS. 5 to 8.

Incidentally, in this embodiment mode, three factors of the injection of the atmospheric air to the intake port 24, the touchdown of the rotor 11 and the scuffing of the protective bearings 6 and 7 will be considered as the abnormal phenomenon of the turbo molecular pump 1. In addition, the abnormal phenomenon of the turbo molecular pump 1 with which the protective program 56 copes is not limited to these three factors.

Each of FIGS. 5 to 8 is a graph showing the change in rpm of the rotor 11 with the rpm in ordinate and the time in abscissa.

Figure 5:
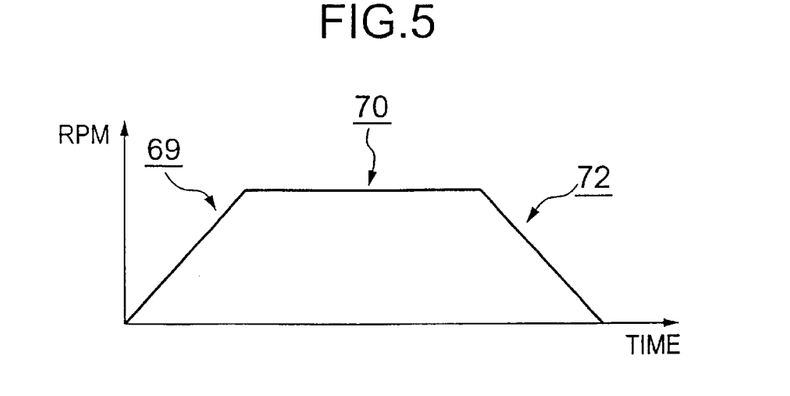
FIG. 5 is a graph showing a relationship between time and an rpm of a rotor in the case where the turbo molecular pump operates normally.

FIG. 5 is a graph showing the relationship between the rpm of the rotor 11 and the time in the case where the turbo molecular pump 1 works normally without any abnormal phenomenon.

The rpm of the rotor 11 is increased at a predetermined rate after the starting (region 69), and the rotor 11 rotates at a constant speed after the completion of the acceleration (region 70). When the operation is to be finished, the rotor 11 is decelerated at a predetermined rate (region 72) and stopped.

Figure 6:
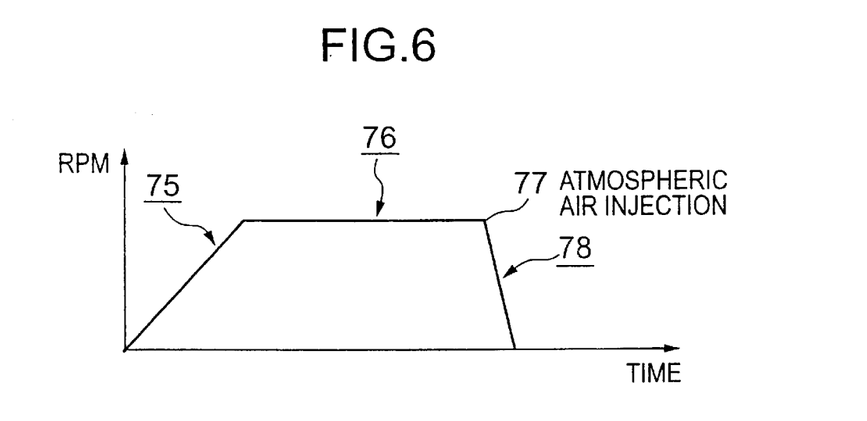
FIG. 6 is a graph showing a relationship between time and a rotating speed of a rotor in the case where the atmospheric air is injected into the intake port during the operation of the turbo molecular pump.

FIG. 6 is a view showing the relationship between the rotating speed of the rotor 11 and the time in the case where the atmospheric air is injected into the intake port 24 during the operation of the turbo molecular pump 1.

The rpm of the rotor 11 is increased at a predetermined rate after the starting (region 75), and the rotor 11 rotates at a constant speed after the completion of the acceleration (region 76). When the atmospheric air is injected during the operation (point of time 77), the rotor 11 is decelerated rapidly (region 78).

Figure 7:
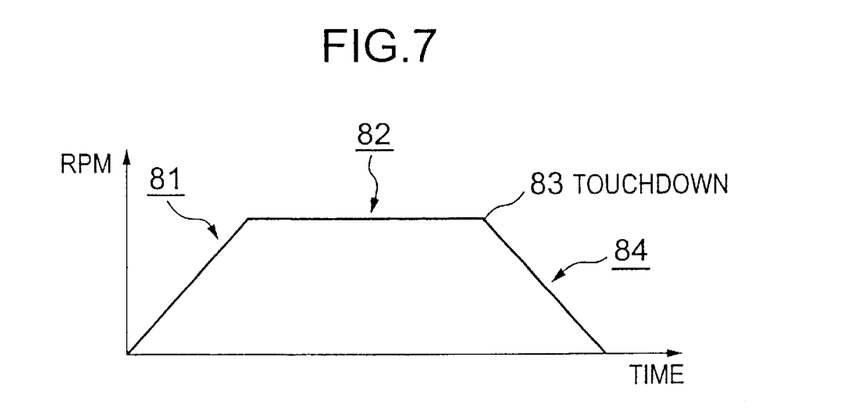
FIG. 7 is a graph showing a relationship between time and a rotating speed of a rotor in the case where the rotor is touched down.

FIG. 7 is a graph showing the relationship between the rotating speed of the rotor 11 and the time in the case where the rotor 11 has been touched down.

The rpm of the rotor 11 is increased at a predetermined rate after the starting (region 81), and the rotor rotates at a constant speed after the completion of the acceleration (region 82). When the touchdown is generated during the operation (point of time 83), the rotating speed of the rotor 11 is reduced rapidly (region 84). However, this reduction rate of the rotating speed is lower than the reduction rate (region 78) in the case where the atmospheric air is injected.

Figure 8:
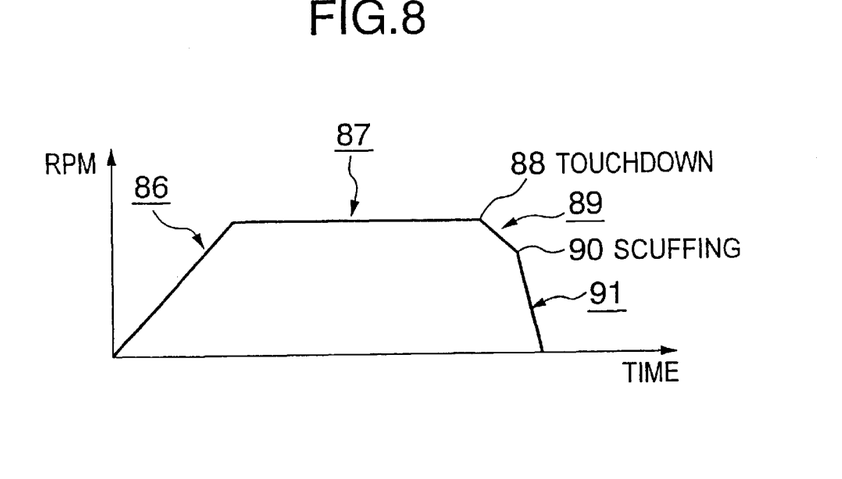
FIG. 8 is a graph showing a relationship between time and a rotating speed of a rotor in the case where a scuffing is generated in the protective bearing after the generation of the touchdown.

FIG. 8 is a graph showing the relationship between the rotating speed of the rotor 11 and the time in the case where the scuffing is generated when, for example, the foreign matter is mixed into the protective bearings 6 and 7 after the generation of the touchdown.

The rpm of the rotor 11 is increased at a predetermined rate after the starting (region 86), and the rotor rotates at a constant speed after the completion of the acceleration (region 87). When the touchdown is generated during the operation (point of time 88), the rotating speed of the rotor 11 is reduced rapidly (region 89). The reduction rate of the rotating speed at this time is the same as that in the region 84. Furthermore, when the scuffing is generated in the protective bearings 6 and 7 (point of time 90), the reduction rate of the rotating speed is further increased (region 91).

As described above, since the reduction rate of the rotating speed of the rotor 11 has the characteristics in accordance with the kind of the abnormal phenomenon, the change rate of the rotating speed of the rotor 11 is inspected whereby it is possible to infer the kind of the abnormal phenomenon generated in the turbo molecular pump 1.

Also, when the parameters other than the change rate of the rotating speed of the rotor 11 are used together, it is possible to infer the kind of the abnormal phenomenon more exactly.

For example, in case of the scuffing and the atmospheric air injection, both cases are similar to each other in that the rpm of the rotor 11 is rapidly decreased but differ largely from each other in load to be applied to the magnetic bearing portion 20.

In the case where the atmospheric air is injected from the intake port 24 during the operation of the turbo molecular pump 1, the large lifting force in the direction toward the intake port 24 is generated in the rotor 11. This is because the rotor blades 21 feed out the injected gas to the exhaust port and its reactive action is given to the rotor 11.

For this reason, the rotor shaft 3 is shifted toward the intake port 24 and at the same time a large load is generated so as to return the rotor shaft 3 back to the predetermined position in the magnetic bearing portion 20. Also, upon the injection of the atmospheric air, the load to be applied to the motor portion 10 is rapidly increased.

In the case where the scuffing is generated in the protective bearings 6 and 7, such characteristics are no longer caused. Therefore, if the load generated in the magnetic bearing portion 20, the displacement of the rotor shaft 3 and the load applied to the motor portion 10 are detected, it is possible to clearly distinguish the atmospheric air injection from the scuffing.

The abnormal phenomenon inference information table 47 of FIG. 4 is one obtained by making the parameters showing the characteristics of each kind into the table so as to make it possible to infer the kind of each abnormal phenomenon described in conjunction with FIGS. 5 to 8.

For example, in the abnormal phenomenon inference information tale 47, in the case where the rotating speed of the rotor 11 is at 30,000 rpm upon the generation of the abnormal phenomenon, if the rotating speed reduction rate is 2,000 rpm or less and the load of the magnetic bearing portion is equal to or greater than 20 kgf, this phenomenon is categorized into the atmospheric air injection, and if the rotating speed reduction rate is at 2,000 rpm or less, this phenomenon is categorized into the touch down. Like this, the characteristics of the parameters inherent in each abnormal phenomenon are expressed in the table.

When the abnormal phenomenon occurs, the various parameters such as the change rate in rpm of the rotor 11 are referred to by the abnormal phenomenon inference information table 47 whereby the kind of the abnormal phenomenon may be inferred.

The abnormal phenomenon inference module 59 compares the parameters such as the change rate in rotating speed of the rotor 11 obtained from the parameter calculation module 58 with the abnormal phenomenon inference information table 47 and infers the kind of the abnormal phenomenon generated in the turbo molecular pump 1.

The point calculation module 60 obtains the kind of the abnormal phenomenon inferred from the abnormal phenomenon inference module 59 and the rotating speed of the rotor 11 at the time when the abnormal phenomenon occurs from the parameter calculation module 58.

The point calculation module 60 obtains from the point table the point showing the magnitude of damage given to the turbo molecular pump 1 by the abnormal phenomenon from the kind of the inferred abnormal phenomenon and the rpm of the rotor 11 upon the generation of the abnormal phenomenon.

The point table is formed for every kind of the abnormal phenomenon.

The point calculation module 60 scans the atmospheric air injection point table 48 in the case where the kind of the abnormal phenomenon is judged as the atmospheric air injection, scans the touchdown point table 49 in the case where the kind of the abnormal phenomenon is judged as the touchdown, and scans the scuffing point table 50 in the case where the kind of the abnormal phenomenon is judged as the scuffing.

Figure 9:
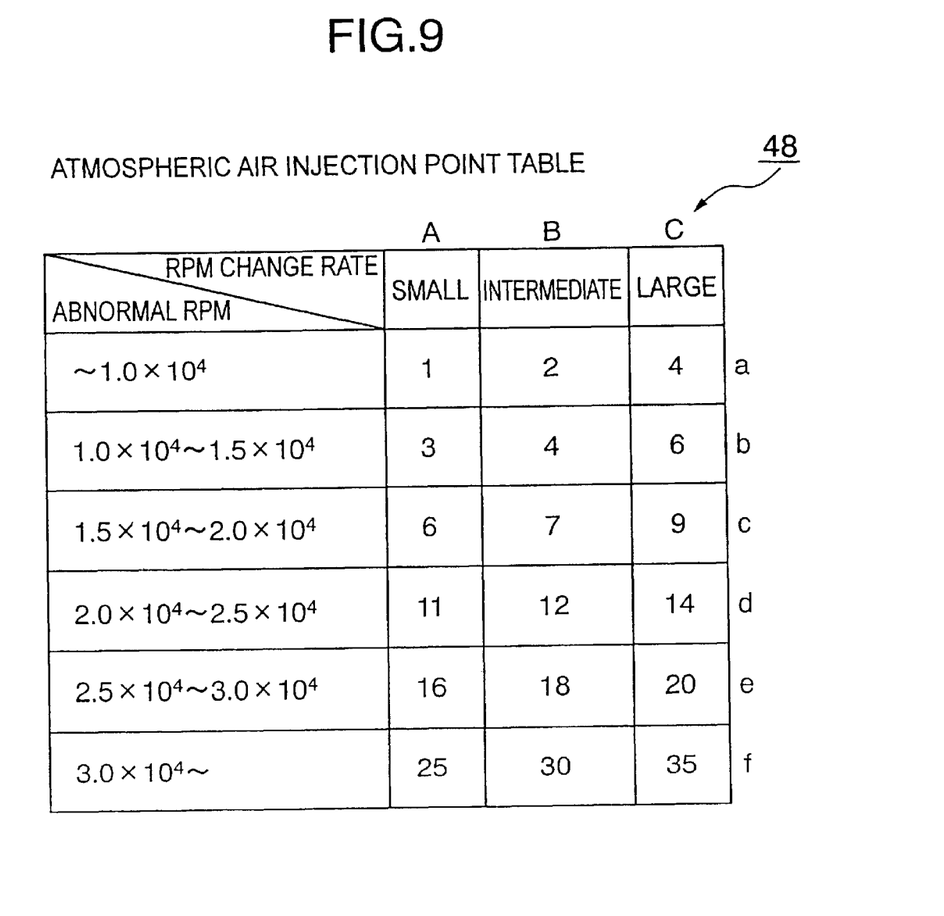
FIG. 9 is a view showing one example of contents of the atmospheric air injection point table.

FIG. 9 is a view showing an example of the contents of the atmospheric air injection point table 48.

The vertical columns a to f divide the rpm of the rotor 11 upon the atmospheric air injection to the intake port 24 from 10,000 rpm to 30,000 rpm for every 5,000 rpm. The higher the rpm of the rotor 11 upon the atmospheric air injection, the larger the damage given to the turbo molecular pump 1 will become. For this reason, the point is set so that the higher the rpm of the rotor 11, the higher the point will become.

The lateral columns A to C express in the three stages the magnitude of the reduction rate of the rotating speed of the rotor 11 when the atmospheric air injection occurs.

For instance, the case where the reduction rate of the rotating speed of the rotor 11 is in the range from 2,000 rpm to 2,500 rpm is expressed by "small", the case where the reduction rate of the rotating speed of the rotor 11 is in the range from 2,500 rpm to 3,000 rpm is expressed by "intermediate", and the case where the rotor 11 is reduced in rotation at the reduction rate higher than 3,000 rpm is expressed as "large".

Also, since the higher the reduction rate of the rotating speed, the higher the load applied to the rotor 11 will become, the damage given to the turbo molecular pump 1 will be increased. For this reason, the higher the reduction rate of the rpm of the rotor 11, the higher the point will be set.

For example, in the case where the point calculation module 60 obtains the atmospheric air injection as the kind of the abnormal phenomenon inferred from the abnormal phenomenon inference module 59, the point calculation module 60 scans the point corresponding on the atmospheric air injection point table 48.

Assuming that the point calculation module 60 obtains the 2,700 rpm as the reduction rate of rotating speed of the rotor 11 and 28,000 rpm as the rotating speed of the rotor 11 upon the generation of the abnormal phenomenon from the parameter calculation module 58, the point calculation module 60 obtains eighteen as the point from the corresponding column of the atmospheric air injection point table 48, i.e., the column Be.

Although not shown in the drawings, in the same manner, the touchdown point table 49 and the scuffing point table 50 are prepared. These tables are divided in accordance with the change rate of the rpm of the rotor 11 after the generation of the abnormal phenomenon and the rpm of the rotor 11 upon the generation of the abnormal phenomenon in the same manner as the atmospheric air injection point table 48 and are adapted to determined the point in accordance with the change rate of the rpm of the rotor 11 upon the generation of the abnormal phenomenon and the rpm of the rotor 11 after the generation of the abnormal phenomenon.

The accumulated point renewal module 61 receives the point, scanned by the point calculation module 60, from the point calculation module 60 and adds this to the points accumulated in the accumulated point storage portion 51.

The accumulated point storage portion 51 is provided in the storage portion 46 and the point is added whenever the abnormal phenomenon occurs in the turbo molecular pump 1. It is possible to infer the sum of the damage given by the past abnormal phenomenon to the turbo molecular pump 1 in accordance with the value of the points stored in the accumulated point storage portion 51.

The point comparison module 62 compares the value of the point stored in the accumulated point storage portion 51 with the value stored in the threshold value storage portion 52. A certain value is stored in the threshold value storage portion 52.

This value is an upper limit of the sum of the values of points obtained in accordance with the experiments. In the case where the sum of the values of points is smaller than the upper limit, it is possible to use the turbo molecular pump 1 in safety. In the case where the sum of the values of points exceeds this upper limit, it is necessary to perform the maintenance such as inspection of the turbo molecular pump 1 or exchange of the parts.

As a result of the comparison, the point comparison module 62 transmits the abnormal phenomenon processing signal to the abnormal phenomenon processing module 63 in the case where the value of the points stored in the accumulated point storage portion 51 is greater than the value stored in the threshold value storage portion 52.

In the case where the value of the points stored in the accumulated point storage portion 51 is smaller than the value stored in the threshold value storage portion 52, the point comparison module 62 no longer generates the signal to the abnormal phenomenon processing module 63.

For example, assume that the value stored in the threshold value storage portion 52 is 50.

Whenever the abnormal phenomenon occurs in the turbo molecular pump 1, the point is added to the accumulated point storage portion 51. When the sum of the value of the added points exceeds 50, the point comparison module 62 transmits the abnormal phenomenon processing signal to the abnormal phenomenon processing module 63.

When the abnormal phenomenon processing module 63 receives the abnormal phenomenon processing signal from the point comparison module 62, the module produces the stop signal for stopping the operation of the turbo molecular pump 1 and sends it to the central control section 36.

When the central control section 36 receives the stop signal from the abnormal phenomenon processing module 63, it stops the operation of the turbo molecular pump 1. The section displays a predetermined error code to the operator and alarms that the sum of the accumulated points exceeds the value set in the threshold value storage portion 52.

Furthermore, the central control section 36 processes so that even if the turbo molecular pump 1 is tried to be restarted by the operator, the starting is disabled.

Figure 10:
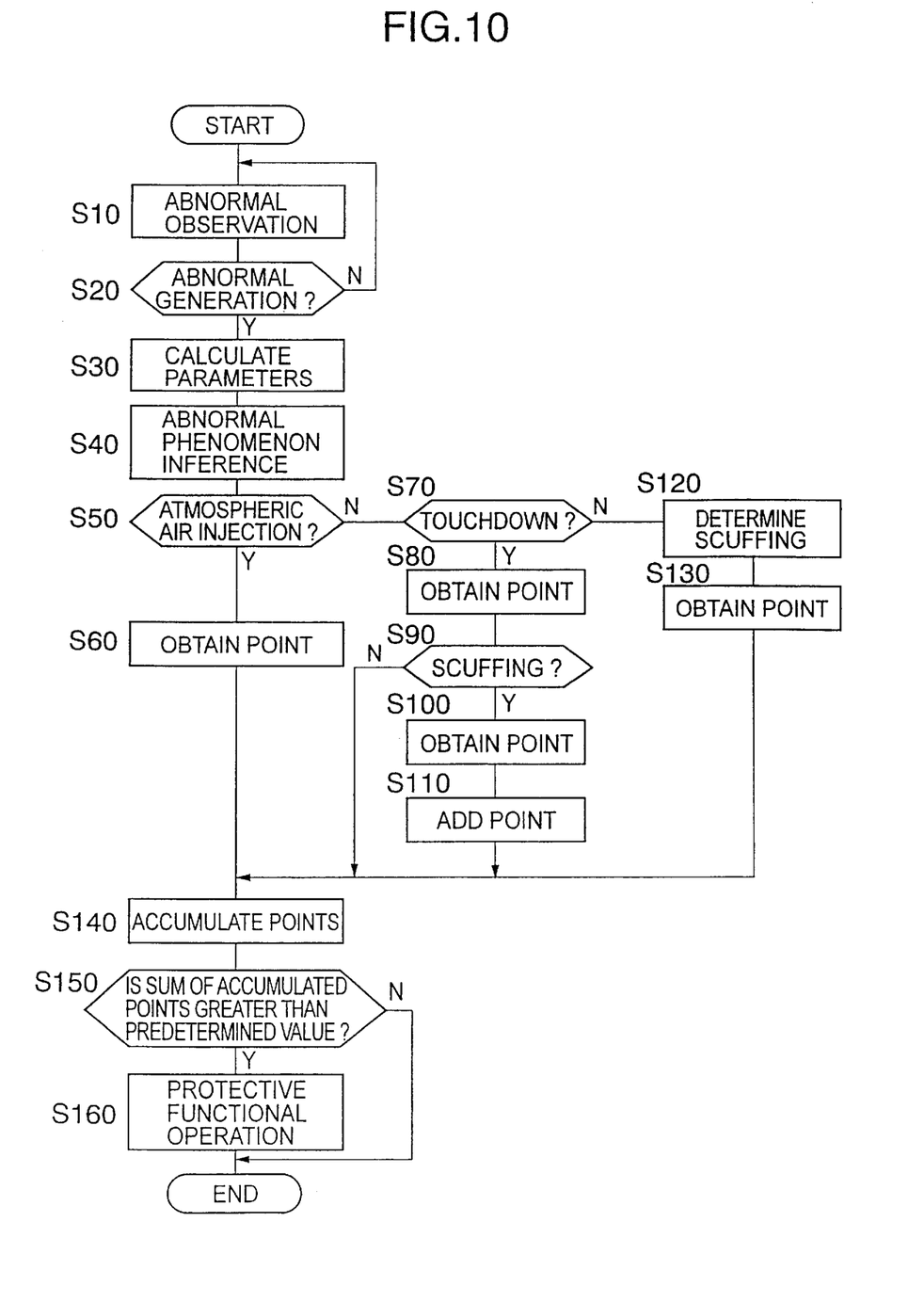
FIG. 10 is a flowchart showing a procedure of steps of the operation of the protective device of the turbo molecular pump in accordance with an embodiment mode of the present invention.

FIG. 10 is a flowchart showing the procedure for the operation of the protective device 35 of the turbo molecular pump in accordance with this embodiment mode.

The central control section 36 of the controller 25 controls suitably the turbo molecular pump 1 and obtains, for example, the vibration of the rotor shaft 3 or the like from the signals of the various sensors after the start of the turbo molecular pump 1 to supervise the generation of the abnormal phenomenon (step 10).

Unless the abnormal phenomenon occurs in the turbo molecular pump 1 (step 20; N), the observation goes on. If the abnormal phenomenon occurs (step 20; Y), the abnormal phenomenon generation signal is transmitted to the protective device 35.

The protective device 35 operates the protective program 56 when receiving the abnormal phenomenon generation signal. First of all, the parameter calculation module 58 analyzes the data stored in the buffer 57 and calculates the various parameters such as the change rate in rpm of the rotor 11 (step 30).

Subsequently, the abnormal phenomenon inference module 59 compares the parameter received from the parameter calculation module 58 with the characteristics of each abnormal phenomenon stored in the abnormal phenomenon information table 47 and infers the kind of the abnormal phenomenon generated in the turbo molecular pump 1 (step 40). Then the abnormal phenomenon inference module 59 feeds the inference result to the point calculation module 60.

Subsequently, the point calculation module 60 obtains the kind of the abnormal phenomenon from the abnormal phenomenon inference module 59 and obtains from the parameter calculation module 58 the reduction rate of the rpm of the rotor 11 after the generation of the abnormal phenomenon and the rpm of the rotor 11 when the abnormal phenomenon is generated and the like.

The point calculation module 60 determines whether or not the inferred abnormal phenomenon is the atmospheric air injection (step 50).

In the case where the inferred abnormal phenomenon is the atmospheric air injection (step 50; Y), the point calculation module 60 searches the corresponding point from the atmospheric air injection point table 48 (step 60) and feeds the searched point to the accumulated point renewal module 61.

In the case where the inferred abnormal phenomenon is not the atmospheric air injection (step 50; N), the point calculation module 60 determines whether or not the inferred abnormal phenomenon is the touchdown (step 70).

In the case where the inferred abnormal phenomenon is the touchdown (step 70; Y), the point calculation module 60 searches the corresponding point from the touchdown point table 49 (step 80).

Furthermore, the point calculation module 60 determines whether or not the scuffing is generated during the touchdown from the data received from the abnormal phenomenon inference module 59 (step 90). In the case where the scuffing is not generated (step 90; N), the point calculation module 60 feeds the point searched from the touchdown point table 49 to the accumulated point renewal module 61.

In the case where the scuffing is generated (step 90; Y), the point calculation module 60 searches the corresponding point from the scuffing point table (step 100). Subsequently, the point calculation module 60 adds the point searched from the scuffing point table 50 in step 100 to the point searched from the touchdown point table 49 in step 80 (step 110).

The point calculation module 60 feeds the point added in step 100 to the accumulated point renewal module 61.

In the case where the inferred abnormal phenomenon is not the touchdown (step 70; N), the point calculation module 60 determines that the inferred abnormal phenomenon is the scuffing (step 120). The point calculation module 60 searches the corresponding point from the scuffing point table 50 (step 130) and feeds the searched point to the accumulated point calculation module 61.

When the accumulated point renewal module 61 receives the point from the point calculation module 60, it adds this point to the point stored in the accumulated point storage portion 51 (step 140). The accumulated point renewal module 61 feeds the point comparison signal to the point comparison module 62 after renewing the point of the accumulated point storage portion 51.

When the point comparison module 62 receives the point comparison signal from the accumulated point renewal module 61, it compares the point stored in the accumulated point storage portion 51 with the value set up in advance in the threshold value storage portion 52 (step 150).

As a result of the comparison, in the case where the point stored in the accumulated point storage portion 51 exceeds the value set up in advance in the threshold value storage portion 52 (step 150; Y), the point comparison module 62 transmits the abnormal phenomenon processing signal to the abnormal phenomenon processing module 63.

When the abnormal phenomenon processing module 63 receives the abnormal phenomenon processing signal from the point comparison module 62, it transmits the stop signal for stopping the turbo molecular pump 1 to the central control section 36 (step 160).

As a result of the comparison, in the case where the point stored in the accumulated point storage portion 51 is smaller than the value set up in advance in the threshold value storage portion 52 (step 150; N), the point comparison module 62 takes no step and the protective device 35 ends the operation.

In this embodiment mode, the magnetic bearing type turbo molecular pump 1 has been described as the turbo molecular pump. The invention is not limited but may be applied to a turbo molecular pump using a mechanical bearing type unit instead of the magnetic bearing.

Also, in this embodiment mode, the kind of the abnormal phenomenon generated in the turbo molecular pump 1 is limited to the atmospheric air injection to the intake port 24, the touchdown of the rotor 11 and the scuffing of the protective bearings 6 and 7. However, the system is not limited to the application of these kinds of the abnormal phenomena but it is possible to expand the function of the protective device 35 so as to be able to cope with any other kinds of abnormal phenomena.

It is possible to exemplify as such other types of abnormal phenomena the generation of damage of the bearing portion, the entrainment of foreign matters into the pump, the damage of the revolving bodies such as rotor blades, the external turbulence such as earthquake, the power outage and the like. It is possible to make registration of the characteristics for each of these abnormal phenomena into the abnormal phenomenon inference information table 47 and to prepare the point table to thereby make it also possible to add the point for these abnormal phenomena.

Also, in this embodiment mode, the structure is taken in which the load applied to the rotor shaft 3 is inferred from the exciting current of the electromagnets of the magnetic bearing portions 8, 12 and 20. However, this may be performed by pressure sensors.

As described above, according to this embodiment mode, since it is possible to infer in terms of the index the sum of damage caused in the turbo molecular pump 1 by the abnormal phenomenon such as the past atmospheric air injection, it is possible to perform the inspection or the exchange of parts in good time. For this reason, it is possible to effectively perform the maintenance work of the turbo molecular pump 1.

According to the present invention, it is possible to provide a protective device which accumulates the damage to be received in a turbo molecular pump whenever the abnormal phenomenon is generated in the turbo molecular pump and in which a protective means operates for a turbo molecular pump when the accumulated value exceeds the value set up in advance.

What is claimed is:

1. A protective device for protecting a turbo molecular pump having a rotor mounted for undergoing rotation, an intake port for sucking gas by rotation of the rotor, and an exhaust port for exhausting the gas sucked from the intake port, the protective device comprising:

detecting means for detecting the occurrence of an abnormal phenomenon in the turbo molecular pump;

abnormal phenomenon inference means for inferring a type of the abnormal phenomenon detected by the detecting means;

value obtaining means for inferring a magnitude of damage given to the turbo molecular pump by the abnormal phenomenon inferred by the abnormal phenomenon inference means and for obtaining a value weighted based on the inferred magnitude of the damage;

value accumulation means for accumulating the value obtained by the value obtaining means;

sum obtaining means for obtaining a sum of the values accumulated in the value accumulation means; and protecting means for protecting the turbo molecular pump in a case where the sum obtained by the sum obtaining means exceeds a predetermined value.

2. A protective device according to claim 1; further comprising change rate obtaining means for obtaining a change rate in a rotating speed of the rotor of the turbo molecular pump; wherein the abnormal phenomenon inference means infers the type of the abnormal phenomenon from a change rate in rpm of the rotor obtained by the change rate obtaining means.

3. A protective device according to claim 1; further comprising load detecting means for detecting a load to be applied to the rotor of the turbo molecular pump in an axial direction of the rotor; wherein the abnormal phenomenon inference means infers the type of the abnormal phenomenon from a load detected by the load detecting means.

4. A protective device according to claim 1; further comprising rpm obtaining means for obtaining an rpm of the rotor of the turbo molecular pump; wherein the value obtaining means infers a magnitude of the damage according to the rotating speed of the rotor obtained at least by the rpm obtaining means when the abnormal phenomenon is detected by the detecting means.

5. A protective device according to claim 1; wherein the protecting means includes at least one of stopping means for stopping the turbo molecular pump, restart disabling means for disabling a restart instruction for restarting the turbo molecular pump, and alarm means for giving an alarm to an operator of the turbo molecular pump.

6. A protective device according to claim 1; wherein the abnormal phenomenon inferred by the abnormal phenomenon inference means is the fact that atmospheric air is injected from the intake port during the operation of the turbo molecular pump.

7. A protective device according to claim 1; wherein the type of the abnormal phenomenon inferred by the abnormal phenomenon inference means includes at least one of a touchdown of the rotor to a protective bearing for protecting the rotor of the turbo molecular pump in a case where the rotor is held by a magnetic bearing, a mixture of foreign matters to the bearing for holding the rotor, a power outage of a power to be fed to the turbo molecular pump, and an external turbulence of the turbo molecular pump by an external force.

8. A method of protecting a turbo molecular pump, comprising the steps of:

providing a turbo molecular pump having a rotor for undergoing rotation, an intake port for sucking gas by rotation of the rotor, an exhaust port for exhausting the gas sucked from the intake port, and protecting means for protecting the turbo molecular pump;

detecting the generation of an abnormal phenomenon in the turbo molecular pump;

inferring the type of the abnormal phenomenon when the abnormal phenomenon is detected in the turbo molecular pump;

inferring a magnitude of damage given to the turbo molecular pump by the inferred abnormal phenomenon and obtaining a value weighted based on the inferred magnitude of the damage;

accumulating the value obtained based on the inferred magnitude of the damage;

obtaining a sum of accumulated values; and operating the protecting means to protect the turbo molecular pump in a case where the sum of the accumulated values obtained exceeds a predetermined value.

\* \* \* \* \*